R. A. WESOLEK.
CIRCUIT CLOSER.
APPLICATION FILED NOV. 5, 1918.

1,307,286.

Patented June 17, 1919.

Witnesses

Inventor
R. A. Wesolek
By Victor J. Evans
Attorney

UNITED STATES PATENT OFFICE.

RICHARD A. WESOLEK, OF TOLEDO, OHIO.

CIRCUIT-CLOSER.

1,307,286.  Specification of Letters Patent.  Patented June 17, 1919.

Application filed November 5, 1918. Serial No. 261,295.

*To all whom it may concern:*

Be it known that I, RICHARD A. WESOLEK, a citizen of the United States, residing at Toledo, in the county of Lucas and State of Ohio, have invented new and useful Improvements in Circuit-Closers, of which the following is a specification.

This invention relates to circuit closers for signal lights for automobiles and the means for actuating the same.

The primary object of the invention is to signal the drivers of the cars in the rear by different colored lights when the car is to be stopped or is going ahead.

Another object of the invention is to provide means actuated by the clutch pedal when in normal position for showing a green light and a red light when the pedal is depressed.

The invention also consists in certain other features of construction and in the combination and arrangement of the several parts, to be hereinafter fully described illustrated in the accompanying drawings and specifically pointed out in the appended claims.

In describing my invention in detail, reference will be had to the accompanying drawings wherein like characters denote like or corresponding parts throughout the several views, and in which:—

Figure 1:
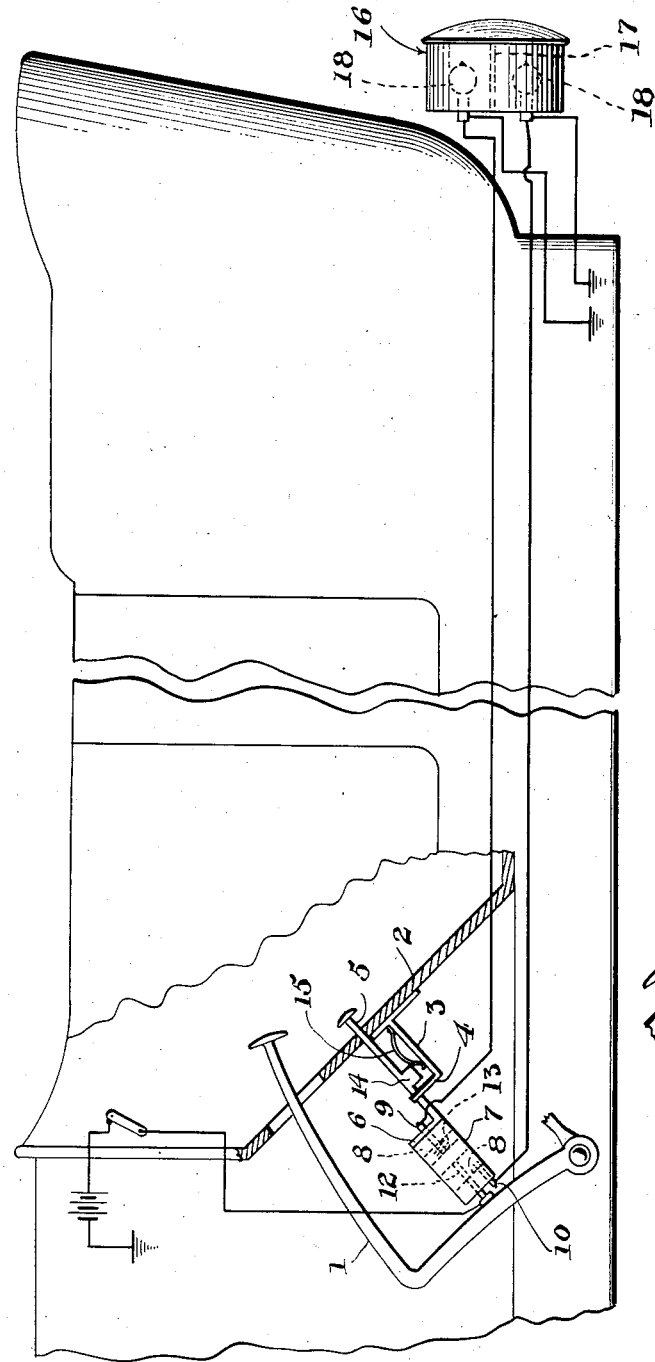
Figure 1 is a diagrammatic view of an automobile supplied with my invention.
Figure 3:
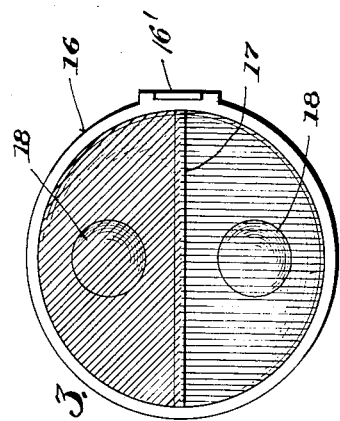
Fig. 3 is a face view of the lamp casing.
Figure 2:
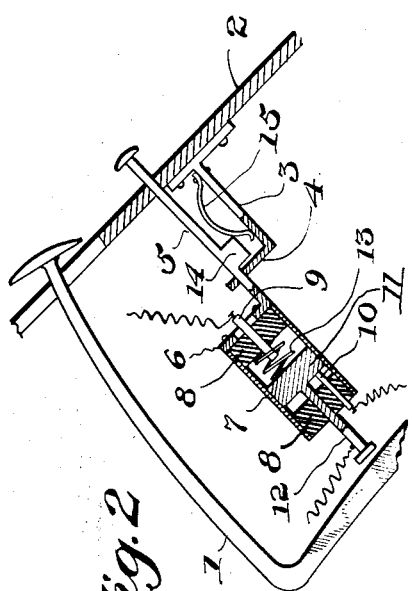
Fig. 2 is an enlarged sectional view of the operating means with the parts thereof in a different position.

In these views, 1 indicates the clutch pedal of the automobile which passes through the inclined part 2 of the floor of said automobile. 3 indicates a bracket having its upper end secured to the under side of said part 2 and having its lower end formed with a right angular extension 4. 5 indicates a push rod slidingly supported in said bracket and having its upper end passing through said floor 2 within convenient reach of the driver of the automobile. The lower end of said rod is provided with a right angular extension 6 to which is secured a casing 7. The ends of this casing is formed of insulated blocks 8. The upper block carries a contact 9 and the lower block carries a contact 10. 11 is a member sliding in said casing between the blocks and having secured thereto a rod 12 which passes through a hole in the lower block 8. The lower end of this rod is provided with a head which is engaged by a part of the clutch pedal. The head is kept in engagement with this part by means of the spring 13 located in the casing between the upper block 8 and the member 11 and tending to force said member downwardly. The rod 5 carries an enlargement 14 which is engaged by a bow shaped spring 15 connected to the bracket. These parts are so arranged that the enlargement will be held by the spring at one or the other end of the bracket as the driver operates the rod 5. This will move the casing 7 and the parts carried thereby so that in one position of the parts the rod 12 will be in contact with the clutch pedal and in the other position said rod will be out of contact with said pedal.

At the rear of the machine I locate a lamp casing 16 which is divided into two compartments by a partition 17. These compartments each contain an ordinary electric lamp 18 and the face of the lower compartment is covered by a transparent plate, preferably of red color while the upper compartment is covered by a like plate of green color. The lamp is provided with the usual side opening 16'.

The lamp in the upper compartment is electrically connected with the contact 9 while the lamp in the lower compartment is connected with the contact 10. The rod 12 is connected with the electric circuit of the automobile.

Thus when the automobile is underway the clutch pedal will force the member 11 into engagement with the contact 9 and thus close the circuit to the lamp in the upper compartment so as to show a green light. When the automobile is to be stopped the clutch is released and this will permit the spring to force the member 11 into engagement with the contact 10 and thus close the circuit to the lamp in the lower compartment to show a red light and thus notify the machines following that the machine ahead is about to stop. If the stop is to be of any duration the driver will pull on the rod 5 so as to raise the casing out of contact with the clutch pedal so as to permit the spring to hold the parts with the red light showing.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having described the invention, what is claimed is:—

1. A device of the class described comprising a pair of contacts, a movable member adapted to engage said contacts, means for actuating said member and means for disengaging said member from the actuating means and causing said member to permanently engage one contact.

2. In combination with an automobile and its clutch pedal, a circuit closer including a casing, a contact on each end of the casing, a movable member in said casing, a rod connected with said member and adapted to be engaged by the clutch pedal to cause said movable member to engage one contact and means for raising said casing above the pedal for causing said movable member to engage permanently the other contact.

In testimony whereof I affix my signature.

RICHARD A. WESOLEK.